United States Patent
Gage

[19]

[11] Patent Number: 6,053,838
[45] Date of Patent: Apr. 25, 2000

[54] HELICAL DIFFERENTIAL ASSEMBLY

[75] Inventor: Garrett W. Gage, Goodrich, Mich.

[73] Assignee: American Axle & Manufacturing, Inc., Detroit, Mich.

[21] Appl. No.: 09/311,514

[22] Filed: May 13, 1999

[51] Int. Cl.[7] .................................................. F61H 48/06
[52] U.S. Cl. ........................ 475/248; 475/252; 74/606 R
[58] Field of Search .................................... 475/248, 249, 475/250, 251, 252; 74/606 R

[56] References Cited

U.S. PATENT DOCUMENTS

| | | |
|---|---|---|
| 1,297,954 | 3/1919 | Williams . |
| 1,305,030 | 5/1919 | Tibbetts . |
| 1,626,120 | 4/1927 | Seeck . |
| 2,479,638 | 8/1949 | Randall . |
| 5,389,048 | 2/1995 | Carlson .................................... 475/252 |
| 5,554,081 | 9/1996 | Bowerman . |
| 5,733,216 | 3/1998 | Bowerman .............................. 475/252 |
| 5,823,907 | 10/1998 | Teraoka et al. ..................... 475/252 X |
| 5,848,950 | 12/1998 | Teraoka et al. . |
| 5,890,984 | 4/1999 | Teraoka et al. ..................... 475/248 X |
| 5,984,823 | 11/1999 | Gage ...................................... 475/248 |

*Primary Examiner*—Khoi Q. Ta
*Attorney, Agent, or Firm*—Harness, Dickey & Pierce, P.L.C.

[57] ABSTRACT

A one-piece differential casing for a parallel-axis differential assembly is provided. The integral casing includes a drum segment defining an internal chamber and a flange segment extending radially from the outer periphery of the drum segment. The casing further includes a window aperture extending through the drum segment that communicates with the chamber, a pair of sockets formed in the axle openings to rotatably support the side gears therein, and paired sets of gear pockets. A set of first pinion pockets are formed as elongated bores which communicate with the internal chamber and have an opening through one end wall of the drum segment. In addition, a set of second pinion pockets are formed as elongated bores which communicate with the internal chamber and have an opening through the opposite end wall of the drum segment. The first and second pinion pockets are arranged in paired sets and each has an axis which is parallel to the axis of the axle openings. After pinions are installed through the openings in the ends of the first and second pinion pockets, plugs are mounted in the openings to enclose the pockets, thereby retaining the pinion in the integral casing.

31 Claims, 7 Drawing Sheets

_Fig-6_

_Fig-7_

HELICAL DIFFERENTIAL ASSEMBLY

FIELD OF THE INVENTION

The present invention relates generally to differentials for use in automotive drivelines and, more particularly, to a helical gear differential assembly having a one-piece differential casing.

BACKGROUND OF THE INVENTION

Many of the differentials used in automotive drivelines include a planetary gearset which is supported within a differential casing to facilitate relative rotation (i.e., speed differentiation) between a pair of output shafts. For example, in parallel-axis differentials the gearset typically includes a pair of helical side gears that are splined to the ends of axle shafts and which are meshed with paired sets of helical pinions journalled in gear pockets formed in the differential casing. Since the gear pockets are parallel to the rotary axis of the differential casing, each pinion rotates on an axis that is parallel to the common axis of the axle shafts and the side gears. As is known, the torque transmitted through meshed engagement of the side gears and pinions generates thrust forces that are exerted by the gear components against the wall surface of the gear pockets and other thrust surfaces within the differential casing to frictionally limit speed differentiation and proportion torque between the axle shafts.

To facilitate assembly of the gearset, the differential casing is a two-piece assembly having an elongated drum housing mounted to a cover plate. Typically, the gearset is mounted in an interior chamber formed in the drum housing which is then enclosed by the cover plate. When assembled, a radial mounting flange on the drum housing mates with a rim segment of the cover plate. As is conventional, a ring gear is secured to the drum housing via bolts mounted in aligned bores in the mounting flange and rim segment. One problem associated with conventional helical parallel-axis differentials pertains to maintaining proper alignment between the differential casing and the gearset. This problem frequently occurs with two-piece differential casings when the case components do not properly align such that the axle bores are misaligned relative to one another and with respect to the mounting flange.

To guard against the manufacture of differentials with excessive misalignment between the axes of the various rotary components, some manufacturers have incorporated an assembly step into their manufacturing process wherein the two case components are assembled together and subsequently machined as a unit. While this assembly step has been employed with some degree of success, this process is costly due to the subsequent need to disassemble the casing for the installation of the gearset. Furthermore, precise alignment of the components cannot be guaranteed after disassembly of the two-piece casing and, as such, some degree of misalignment is still unavoidable. Consequently, there remains a need in the art for a helical parallel-axis differential assembly with means to improve the relative alignment between the differential case, the axles, and the gear components of the gearset.

SUMMARY OF THE INVENTION

Thus, it is an object of the present invention to provide a one-piece casing for use in differentials and which is superior to conventional two-piece case assemblies in terms of function, cost and simplified assembly.

In accordance with the invention, a one-piece differential casing for a parallel-axis differential assembly is provided. The integral casing includes a drum segment defining an internal chamber, a flange segment extending radially from the outer periphery of the drum segment, and a pair of tubular trunions extending axially from opposite end walls of the drum segment which define colinear axle openings that communicate with the internal chamber. The casing further includes a window aperture extending through the drum segment which communicates with the chamber, a pair of sockets formed in the axle openings to rotatably support the side gears, and paired sets of gear pockets. In particular, a set of first pinion pockets are formed as elongated cylindrical bores which communicate with the internal chamber and have an opening through one end wall of the drum segment and which terminate with a radial end surface. In addition, a set of second pinion pockets are formed as elongated cylindrical bores which communicate with the internal chamber and have an opening through the opposite end wall of the drum segment and which terminate with a radial end surface. The first and second pinion pockets are arranged in overlapped paired sets and each has an axis which is parallel to the axis of the axle openings. After pinions are installed through the openings in the first and second pinion pockets, plugs are mounted in the openings to enclose the pockets, thereby retaining the pinions in the integral casing.

Further areas of applicability of the present invention will become apparent from the detailed description provided hereinafter. It should be understood however that the detailed description and specific examples, while indicating a preferred embodiment of the invention, is intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

With reference to the drawings, a differential assembly 10 for use in motor vehicle applications will be described in sufficient detail to explain the structure and function of the unique one-piece or "integral" casing structure. While differential assembly 10 is shown to be of the helical parallel-axis type used in motor vehicle driveline applications, it is to be understood that the one-piece casing of the present invention is applicable for use with many variants of differential assembly 10 and, as such, the particular structure shown is intended merely to be exemplary in nature.

Figure 1:
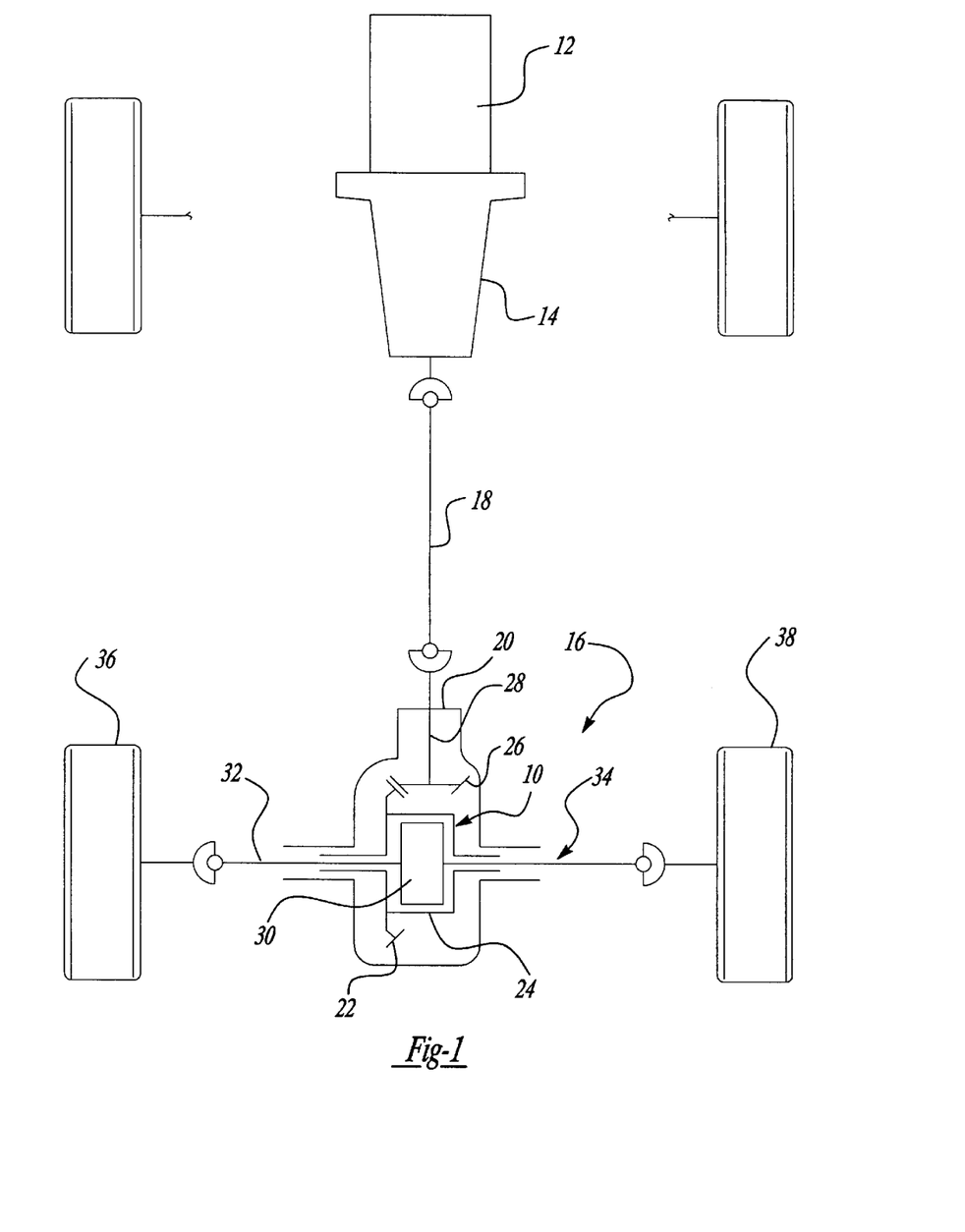
FIG. 1 is a schematic illustration of an exemplary driveline for a motor vehicle equipped with the differential assembly of the present invention.

Prior to the description of the components associated with differential assembly 10, an exemplary driveline for a motor vehicle equipped with differential assembly 10 will be explained with particular reference to FIG. 1. Specifically, the motor vehicle driveline is shown to include an engine 12, a transmission 14, a rear axle assembly 16, and a propshaft 18 for supplying drive torque from transmission 14 to rear axle assembly 16. Rear axle assembly 16 includes differential assembly 10 which is rotatably supported within a differential carrier 20. A ring gear 22 is fixed to a casing 24 of differential assembly 10 and is meshed with a drive pinion 26 that is fixed to a pinion shaft 28. As is conventional, pinion shaft 28 is connected to propshaft 18. As such, engine power is transmitted by transmission 14 to rotatively drive differential carrier 24. As will be further detailed, a gearset 30 is supported within casing 24 and operably interconnects a pair of axle shafts 32 and 34 which, in turn, are connected to wheels 36 and 38, respectively.

Figure 2:
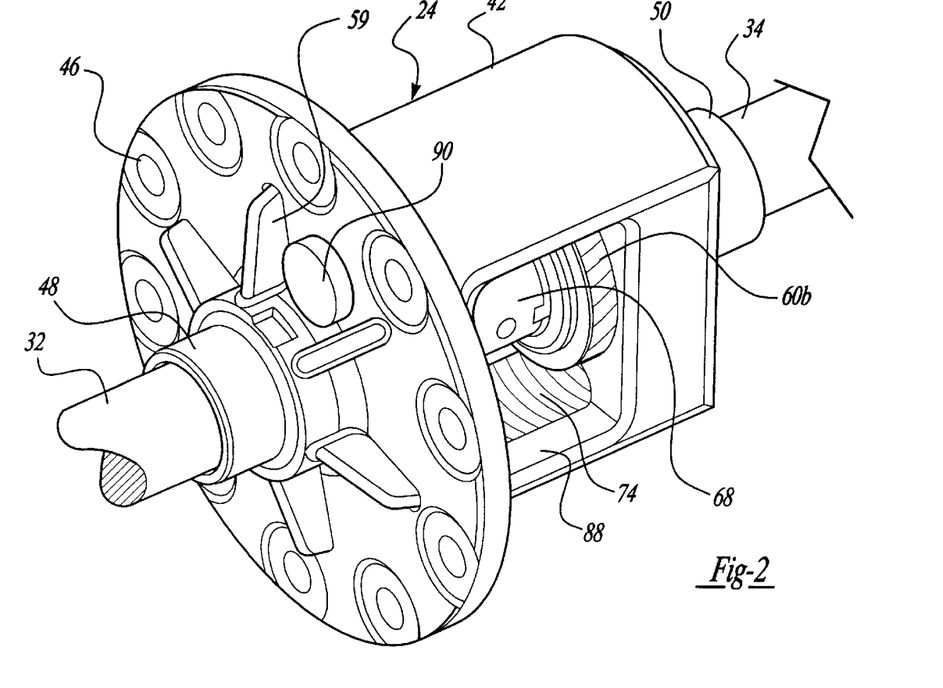
FIG. 2 is a perspective view of a differential assembly equipped with the one-piece differential case of the present invention.
Figure 3:
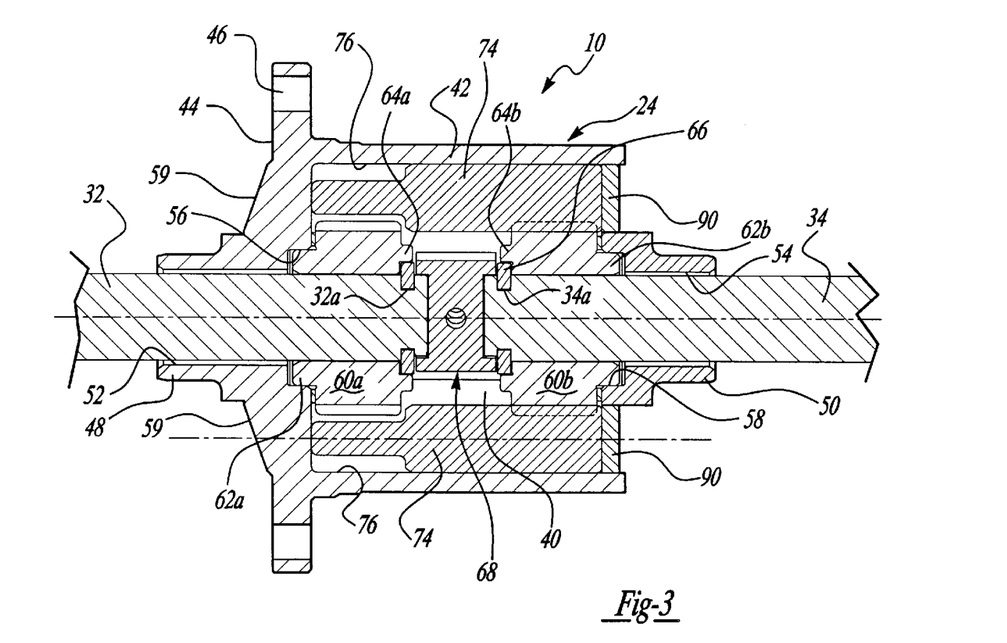
FIG. 3 is a sectional view of the differential assembly shown in FIG. 2.
Figure 4:
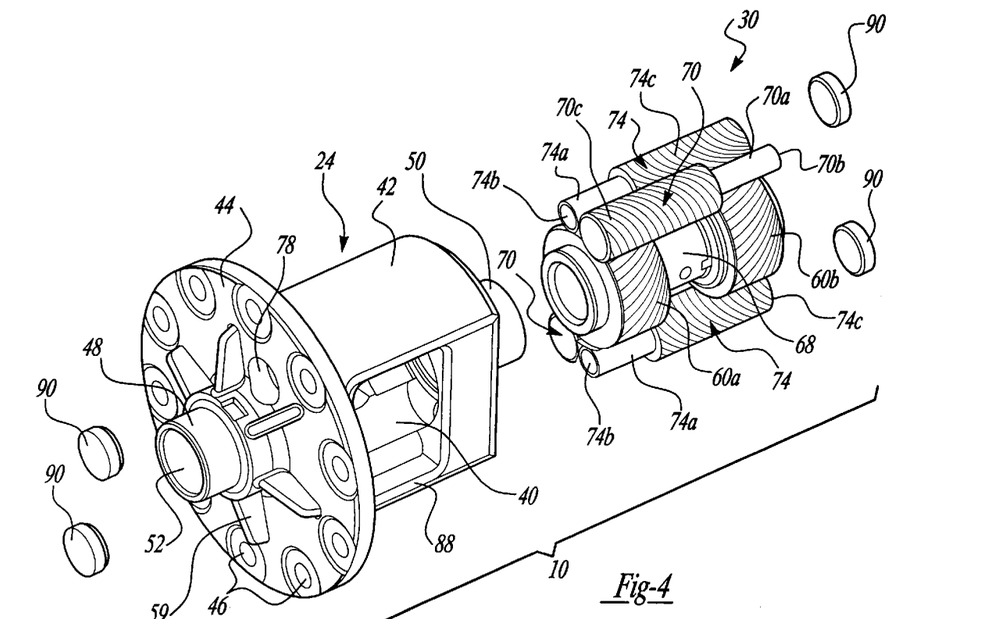
FIG. 4 is an exploded perspective view of the differential assembly.
Figure 5:
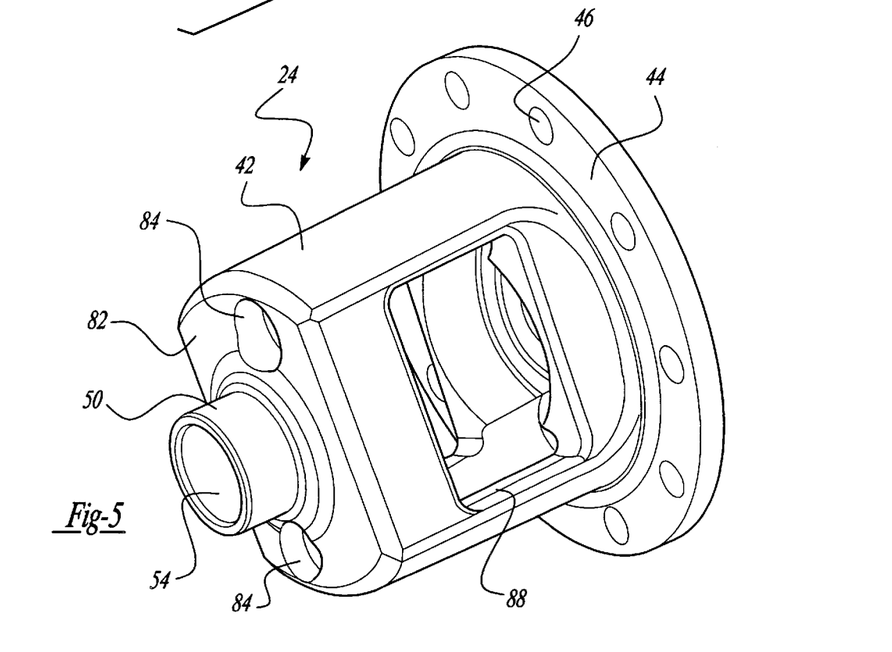
FIG. 5 is another perspective view of the differential casing shown in FIG. 4.
Figure 6:
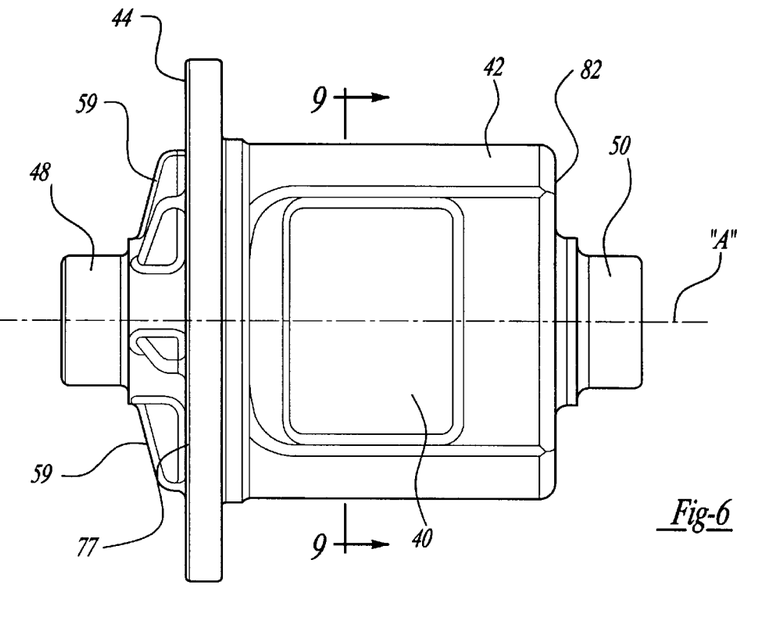
FIG. 6 is a side view of the differential casing shown in FIGS. 4 and 5.
Figure 7:
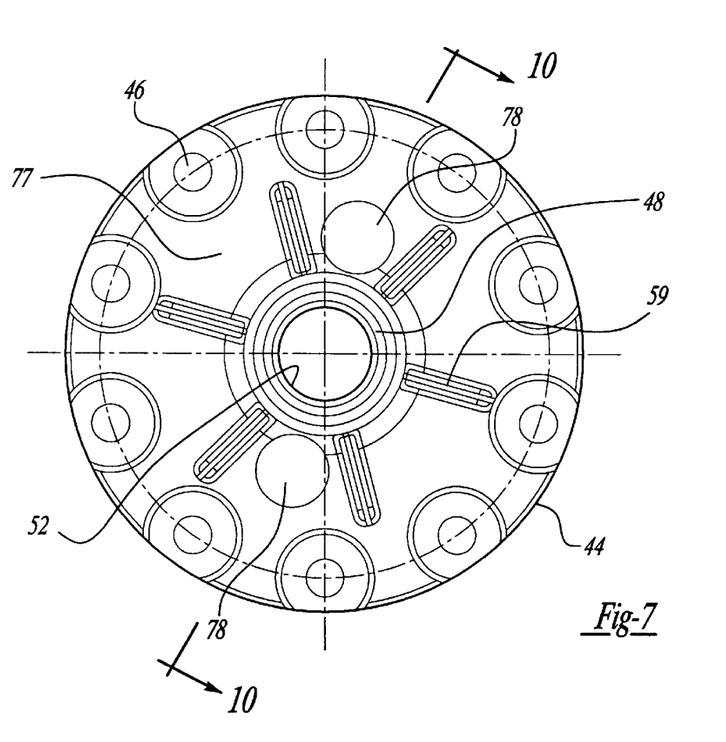
FIGS. 7 and 8 are end views of the differential casing.
Figure 8:
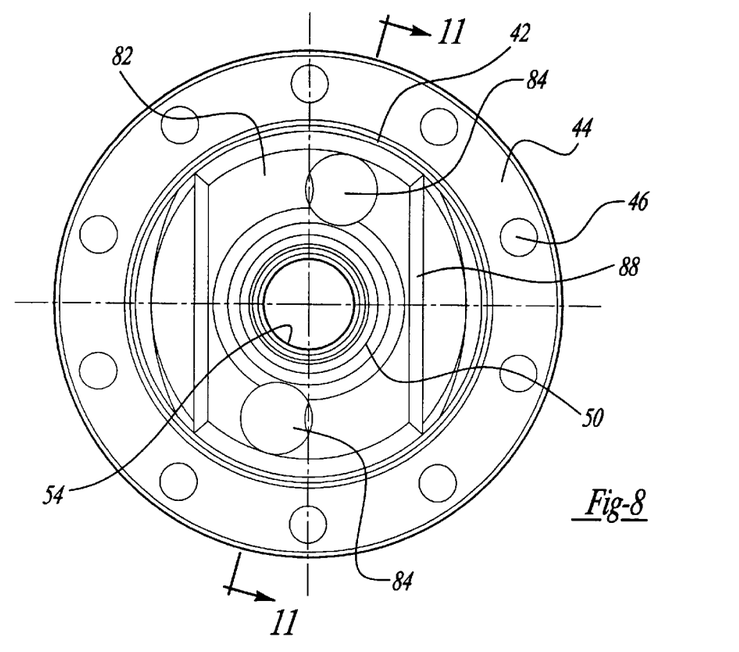
Figure 9:
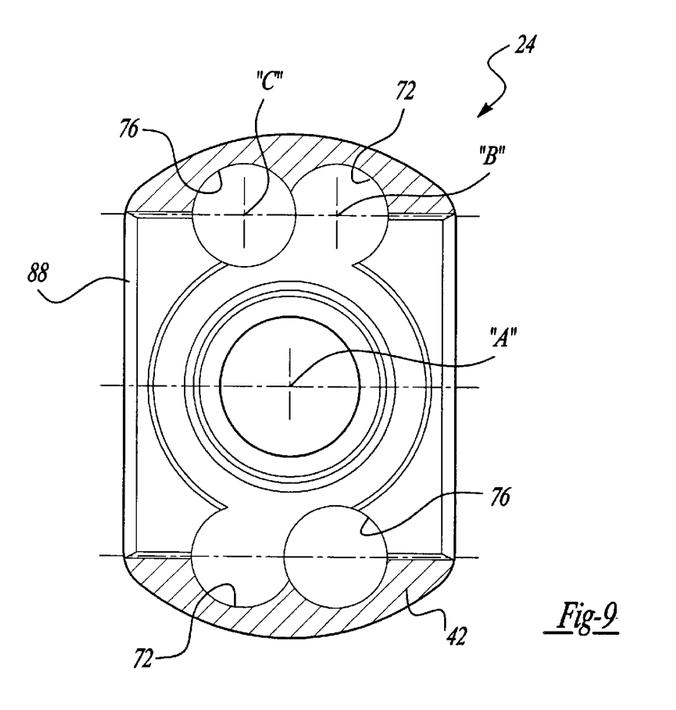
FIG. 9 is a sectional view of the differential casing taken generally along line 9—9 of FIG. 6.

Differential assembly 10 includes a unitary (i.e., one-piece) casing 24 which defines an internal chamber 40 within which gearset 30 is supported. In particular, casing 24 includes a drum segment 42 and an end flange segment 44 extending radially from a first end of drum segment 42 and having circumferentially aligned mounting apertures 46. Casing 24 is preferably a cast or molded component fabricated from cast iron or magnesium. As is known, ring gear 22 is fixed to radial flange segment 44 to transfer rotary power (i.e., drive torque) to differential casing 24. Casing 24 also includes tubular axle trunions 48 and 50 which respectively define axially aligned axle openings 52 and 54 that communicate with chamber 40. Axle trunion 48 extends outwardly from the first end of drum segment 42 while axle trunion 50 extend outwardly from a second end of drum segment 42. Axle openings 52 and 54 are adapted to receive and rotatably support end segments of axle shafts 32 and 34 for rotation about a central rotary axis, denoted by construction line "A". In addition, annular sockets 56 and 58 are formed in axle openings 52 and 54 adjacent to chamber 40 for rotatably supporting components of gearset 30. A series of lugs 59 are provided on the first end of drum segment 42 between radial flange segment 44 and axle trunion 48 to provide additional structural rigidity to differential casing 24.

As noted, differential assembly 10 includes a planetary gearset 30 which is operable for transferring drive torque from casing 24 to axle shafts 32 and 34 in a manner facilitating speed differential and torque biasing therebetween. Gearset 30 is mounted in chamber 40 and includes a pair of helical side gears 60a and 60b having internal splines that are adapted to mesh with external splines on corresponding end segments of axle shafts 32 and 34. In addition, side gears 60a and 60b respectively include first axial hubs 62a and 62b which are seated in corresponding annular sockets 56 and 58 formed in casing 24. Side gears 60a and 60b also respectively include second axial hubs 64a and 64b. C-shaped retainer springs, or C-clips 66 are retained in aligned shaft grooves 32a, 34a and second axial hubs 64a, 64b for axially positioning and restraining side gears 60a, 60b between end wall surfaces of casing 24 and the end segments of axle shafts 32 and 34. Gearset 30 further includes a spacer block assembly 68 for maintaining side gears 60a, 60b and axle shafts 32, 34 in axially spaced relation relative to each other while preventing unintentional release of C-clips 66 from grooves 32a, 34a. Once installed, spacer block assembly 68 is free to rotate with respect to either axle shaft 32, 34 and casing 24.

As best seen from FIGS. 3 and 4, helical gearset 30 also includes a set of first helical pinions 70 journally supported in first pockets 72 formed in casing 24, and a set of second helical pinions 74 journally supported in second pockets 76 formed in casing 24. While not limited thereto, differential assembly 10 is shown to include two each of first pinions 70 and second pinions 74. Pockets 72 and 76 are elongated, partially cylindrical bores and are formed in paired sets such that they communicate with chamber 40. In addition, pockets 72 and 76 are equidistant and circumferentially aligned so as to define pinion rotary axes "B" for first pinions 70 and "C" for second pinions 74 that are parallel to the rotational axis "A".

Figure 10:
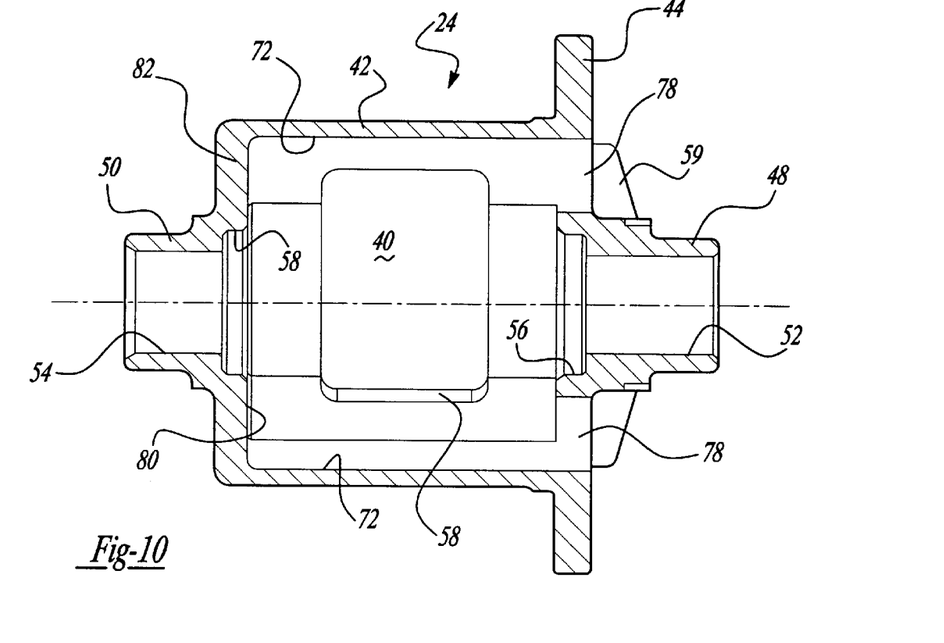
FIG. 10 is a sectional view taken generally along line 10—10 of FIG. 7.
Figure 11:
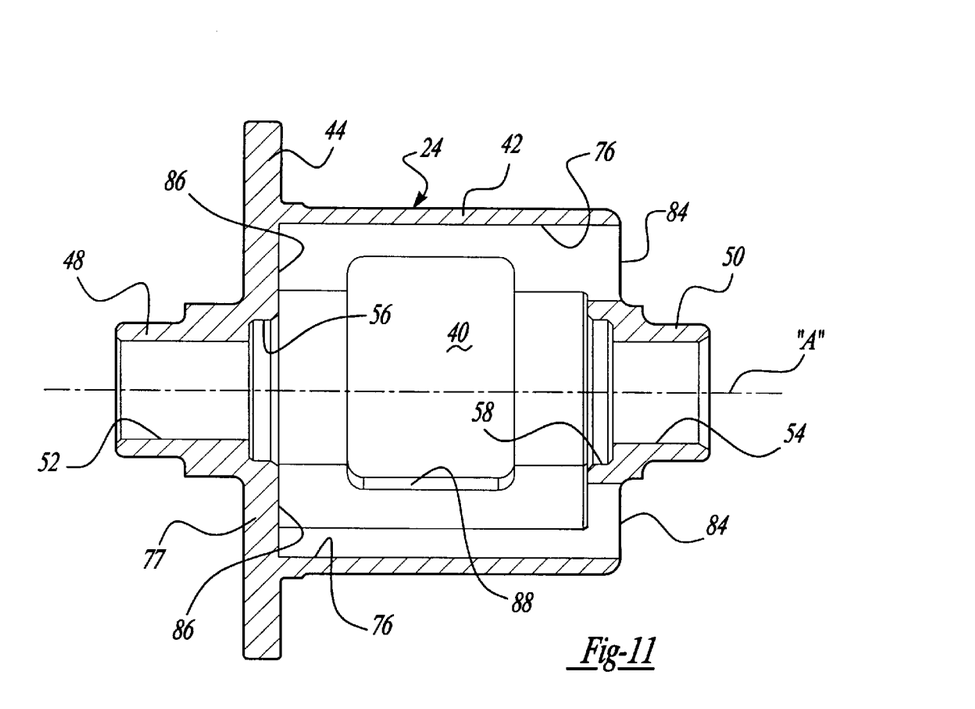
FIG. 11 is a sectional view taken generally along line 11—11 of FIG. 8.

As best seen from FIGS. 10 and 11, each first pocket 72 is a blind bore that extends through a first end wall 77 of drum segment 42 to define an opening 78 and which terminates with a radial end surface 80. In contrast, each second pocket 76 is a blind bore that extends through a second end wall 82 of drum segment 42 to define an opening 84 and which terminates with a radial end surface 86. While not required, flange segment 44 of differential casing 24 is shown to be coplanar with first end wall 77 of drum segment 42. At least one, and preferably two, large window apertures 88 are formed in drum segment 42 of casing 24. Window apertures 88 communicate with chamber 40 and portions of pockets 72 and 76 to permit access for machining of casing 24 and to facilitate installation of side gears 60a, 60b. Due to this unitary construction for casing 24, axle openings 52, 54, side gear sockets 56, 58 and pinion pockets 72, 76 can be machined in a single machining set-up (i.e., casing 24 need only be fixtured once to machine the above-noted features), thereby reducing machining labor while concomitantly improving alignment of the rotary axes of pinions 70, 74 relative to central axis "A".

According to the arrangement shown in FIGS. 3 and 4, side gears 60a and 60b are installed into hollow interior 40 through window apertures 88 and positioned into first and second side gear sockets 56 and 58, respectively. Axle shafts 32 and 34 are installed into corresponding axle trunions 48 and 50 and splined to corresponding side gears 60a and 60b. Thereafter, spacer block assembly 68 is installed between side gears 60a and 60b. First pinions 70 are installed into differential casing 24 through openings 78 in first pinion pockets 72. In the particular embodiment shown, a post segment 70a of first pinion 70 is initially introduced into opening 78 and is slid into pocket 72 until its terminal end surface 70b is abutting or in close proximity to end surface 80 of pocket 72. As such, a helically-toothed gear segment 70c of first pinions 70 is meshed with side gear 60a while post segment 70a is spaced from side gear 60b. Likewise, second pinions 74 are installed through openings 84 in second pinion pockets 76 such that a post segment 74a is slid into pocket 76 until its terminal end surface 74b is abutting with or in close proximity to end surface 86 of pocket 76. As each second pinion gear 74 is installed into differential casing 24, its helically-toothed gear segment 74c is meshed with second side gear 60b and with gear segment 70c of one of first pinion gears 70 while its post segment 74a is spaced from side gear 60a. After pinions 70 and 76 have been installed to differential casing 24, plugs 90 are installed in openings 78 and 84 and retained therein by threads, press fitting, staking, welding or any other suitable retaining means. Preferably, plugs are removable to facilitate removal of the pinions during servicing of differential assembly 10. Plugs 90 function to enclose the open ends of pockets 72 and 76, thereby preventing the withdrawal of first and second pinion gears 70 and 74 from differential casing 24.

Figure 12:
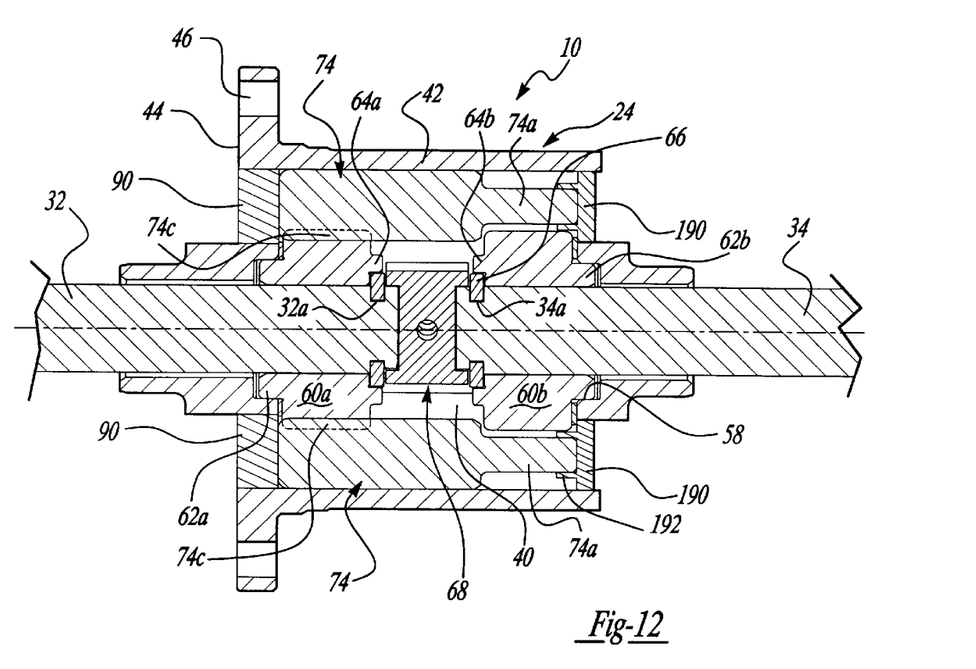
FIG. 12 is a sectional view illustrating a modified version of the differential assembly.

An optional arrangement to that shown in FIGS. 3 and 4 would reverse the installation direction of pinions 70 and 74 such that terminal end surfaces 70b, 74b of post segments 70a, 74a would be located in close proximity to plugs 90. If such an alternative gear arrangement is utilized, plugs 190 of FIG. 12 could be used which each have an annular hub 192 provided for journally supporting post segments 70a, 74a to further limit tipping of pinions 70 and 74 in pockets 72 and 76, respectively.

While the invention has been described in the specification and illustrated in the drawings with reference to several embodiments, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out this invention, but that the invention will include any embodiments falling within the description of the appended claims.

What is claimed is:

1. A differential assembly for interconnecting a pair of axle shafts which share a common rotary axis, said differential assembly comprising:

a one-piece casing rotatable about the pair of axle shafts and including a drum segment defining an internal chamber and first and second axle openings formed through first and second end walls of said drum segment which communicates with said chamber and receive ends of the respective axle shafts, said casing further including a window aperture extending through said drum segment which communicates with said chamber, first and second sockets formed respectively in said first and second end walls between corresponding axle openings and said chamber, a first pinion pocket formed as a blind-bore having a first opening through said first end wall of said drum segment and which communicates with said chamber, and a second pinion pocket formed as a blind-bore having a second opening through said second end wall of said drum segment and which communicates with said chamber;

a first side gear installed through said window aperture into said chamber and seated in said first socket, said first side gear adapted to be fixed for rotation with one of the axle shafts;

a second side gear installed through said window aperture into said chamber and seated in said second socket, said second side gear adapted to be fixed for rotation with the other of the axle shafts;

a first pinion having a first gear segment and a first post segment, said first pinion installed through said first opening into said first pinion pocket such that said first gear segment is meshed with said first side gear and said first post segment is displaced from said second side gear;

a second pinion having a second gear segment and a second post segment, said second pinion installed through said second opening into said second pinion pocket such that said second gear segment is meshed with said second side gear and said first gear segment of said first pinion while said second post segment is displaced from said first side gear; and plugs installed in said first and second openings to enclose said first and second pinion pockets and retain said first and second pinions in said casing.

2. The differential assembly of claim 1 wherein the rotary axis of said first and second pinions is parallel to the common axis of said side gears and said casing.

3. The differential assembly of claim 1 wherein said plugs are removably secured in said openings.

4. The differential assembly of claim 1 wherein said plugs further include an annular support flange in which an end portion of said post segment on said first pinion is rotatably journalled.

5. The differential assembly of claim 1 further comprising additional paired sets of said first and second pinion pockets formed circumferentially in said drum segment of said casing, and a corresponding number of first and second pinions installed in said additional paired sets of pinion pockets.

6. The differential assembly of claim 1 wherein said casing further includes a flange segment extending radially from the periphery of said drum segment, said flange segment having mounting apertures for securing a rotary driven component thereon for driving said casing about the common axis.

7. The differential assembly of claim 6 wherein said flange segment is coplanar with one of said first and second end walls of said drum segment.

8. The differential assembly of claim 1 wherein said first pinion is installed in said first pinion pocket such that an end face surface of said first post segment is in close proximity to said plug and an end face surface of said first gear segment is in close proximity to an end surface of said first pinion pocket.

9. The differential assembly of claim 1 wherein said first pinion is installed in said first pinion pocket such that an end face surface of said first gear segment is in close proximity to said plug and an end face surface of said first post segment is in close proximity to an end surface of said first pinion pocket.

10. The differential assembly of claim 1 further comprising a first tubular axle trunion extending axially from said first end wall of said drum segment and defining said first axle opening, and a second tubular axle trunion extending axially from said second end wall of said drum segment and defining said second axle opening.

11. A differential assembly comprising:

a casing defining a drum segment having an interior chamber, a first axle opening adapted for rotatably supporting an end segment of a first axle shaft, said first axle opening extending from said interior chamber through a first end wall of said drum segment along an axis of said drum segment, a second axle opening adapted for rotatably supporting an end segment of a second axle shaft, said second axle opening extending from said interior chamber through a second end wall of said drum segment along said drum segment axis, at least one window aperture formed through said drum segment, at least two pinion bore sets each having a first pinion pocket extending through openings in said first end wall into said drum segment along an axis that is parallel to said drum segment axis and a second pinion pocket overlapping said first pinion pocket and extending through opening in said second end wall into said drum segment along an axis that is parallel to said drum segment axis and said first pinion pocket axis, a first side gear socket disposed along said drum segment axis and adjacent to said first axle opening and said interior chamber, and a second side gear socket disposed along said drum segment axis and adjacent to said second axle opening and said interior chamber;

a gearset having first and second side gears rotatably supported in said interior chamber that are adapted to be fixed for rotation with the first and second axle shafts, and at least two meshed pinion sets having a first pinion mounted in said first pinion pocket and meshed with said first side gear, and a second pinion mounted in said second pinion pocket and meshed with said second side gear; and plugs mounted in said openings in said first and second end walls.

12. The differential assembly of claim 11 wherein said casing further includes a flange segment extending radially from a peripheral of said drum segment, said flange segment having mounting apertures for securing a rotary driven component thereon for driving said casing about said common axis.

13. The differential assembly of claim 12 wherein said flange segment is coplanar with one of said first and second end walls of said drum segment.

14. The differential assembly of claim 11 wherein said plugs further include an annular support flange in which an end portion of said first pinion is rotatably journalled.

15. The differential assembly of claim 11 further comprising a first tubular axle trunion extending axially from said first end wall of said drum segment and defining said first axle opening, and a second tubular axle trunion extending axially from said second end wall of said drum segment and defining said second axle opening.

16. A differential assembly comprising:

a differential case having a unitarily formed drum segment which includes a hollow interior, a first axle opening extending from said hollow interior through a first end wall of said drum segment and centered on an axis of said drum segment, a second axle opening extending from said hollow interior through a second end wall of said drum segment and centered on said drum segment axis, at least two pinion bore sets each having a first pinion pocket extending through said first end wall into said drum segment along an axis parallel to said drum segment axis and a second pinion pocket overlapping said first pinion pocket and extending through said second end wall into said drum segment along an axis parallel to said drum segment axis and said first pinion bore axis, a first side gear socket disposed along said drum segment axis and adjacent to said first axle opening and said hollow interior, and a second side gear socket disposed along said drum segment axis and adjacent to said second axle opening and said hollow interior;

a first side gear positioned within said hollow interior and seated in said first side gear socket for rotation about said drum segment axis;

a second side gear positioned within said hollow interior and seated in said second side gear socket for rotation about said drum axis;

at least two planet gearsets each having a first pinion disposed within one of said first pinion pockets and meshingly engaged with said first side gear, and a second pinion disposed within said corresponding second overlapping pinion pocket and meshingly engaged with said second side gear and said first pinion gear; and plugs disposed in an open end of each of said first and second pinion pockets and which are secured to said first and second end walls.

17. The differential assembly of claim 16 wherein at least one of said plugs is fixed to said differential casing by welding.

18. The differential assembly of claim 16 wherein at least one of said plugs is fixed to said differential casing by staking.

19. The differential assembly of claim 16 wherein at least one of said plugs is fixed to said differential casing by press-fitting.

20. The differential assembly of claim 16 wherein said plugs are removably secured in said openings.

21. The differential assembly of claim 16 wherein said plugs further include an annular support flange in which a post segment of said first pinion is rotatably journalled.

22. The differential assembly of claim 16 wherein said casing further includes a flange segment extending radially from a peripheral of said drum segment, said flange segment having mounting apertures for securing a rotary driven component thereon for driving said casing about said common axis.

23. The differential assembly of claim 22 wherein said flange segment is coplanar with one of said first and second end walls of said drum segment.

24. The differential assembly of claim 16 wherein said first pinion is installed in said first pinion pocket such that an end face surface of a post segment is in close proximity to said plug and an end face surface of a gear segment is in close proximity to an end surface of said first pinion pocket.

25. The differential assembly of claim 16 further comprising a first tubular axle trunion extending axially from said first end wall of said drum segment and defining said first axle opening, and a second tubular axle trunion extending axially from said second end wall of said drum segment and defining said second axle opening.

26. A differential assembly comprising:

a differential casing defining a chamber, a pair of aligned axle openings communicating with said chamber, a set of first pinion bores extending through a first end wall of said casing into said chamber, and a set of second pinion bores extending through a second end wall of said casing into said chamber;

a pair of axle shafts extending through said axle openings in said differential casing and having end segments located within said chamber;

a pair of side gears disposed in said chamber and fixed to said end segments of said axle shafts;

paired sets of first and second pinions rotatably mounted within said first and second pinion bores and in meshed engagement with each other and with one of said side gears; and plugs mounted in openings formed in said first and second end walls to close said first and second pinion bores for retaining said first and second pinions therein.

27. The differential assembly of claim 26 wherein said plugs are removably secured in said openings.

28. The differential assembly of claim 26 wherein said plugs further include an annular support flange in which said post segment of said first pinion is rotatably journalled.

29. The differential assembly of claim 26 wherein said casing further includes a flange segment extending radially from a peripheral thereof and having mounting apertures for securing a rotary driven component thereon for driving said casing about said common axis.

30. The differential assembly of claim 26 wherein said first pinion is installed in said first pinion bore such that an end face surface of a post segment is in close proximity to said plug and an end face surface of a gear segment is in close proximity to an end surface of said first pinion bore.

31. The differential assembly of claim 26 further comprising a first tubular axle trunion extending axially from said first end wall of said casing and defining said first axle opening, and a second tubular axle trunion extending axially from said second end wall of said casing and defining said second axle opening.

* * * * *